United States Patent [19]
Rinck

[11] 3,935,835
[45] Feb. 3, 1976

[54] APPARATUS FOR CHECKING THE LEVEL OF LIQUID IN CONTAINERS

[76] Inventor: Hans-Joachim Rinck, Sylvaner Weg 4, 7900 Ulm (Danube), Germany

[22] Filed: Aug. 26, 1974

[21] Appl. No.: 500,404

[30] Foreign Application Priority Data
Sept. 3, 1973 Germany............................ 2344364

[52] U.S. Cl............................... 116/118 R; 73/303
[51] Int. Cl.² ......................................... G01F 23/16
[58] Field of Search....... 116/118 R, 118 A; 73/303, 73/26.7 R, 298

[56] References Cited
UNITED STATES PATENTS
3,699,914  10/1972  Smith............................. 116/118 R FOREIGN PATENTS OR APPLICATIONS
1,698,047  9/1971  Germany
2,130,068  12/1971  Germany
397,123  6/1924  Germany
1,209,899  10/1970  United Kingdom Primary Examiner—S. Clement Swisher
Assistant Examiner—Denis E. Corr

[57] ABSTRACT

Apparatus for checking the presence of liquid at a predetermined level in a container is disclosed. The apparatus comprises valve means disposed externally of such container, manually operable suction means to generate vacuum pressure and connected to the valve means, elongate duct means having constriction means between a first end portion extending into such container to define an opening in the duct means at the predetermined level and a second end portion connected to the valve means, the valve means being actuable by the suction means to close the duct means only on liquid being present at the predetermined level in such container, and indicator means responsive to the closure of the duct means by the valve means to indicate the presence of liquid at the predetermined level in such container.

22 Claims, 5 Drawing Figures

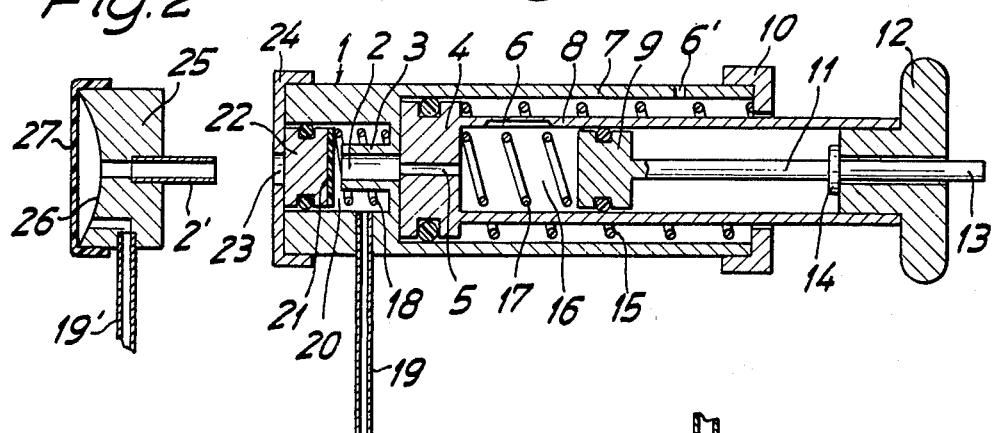
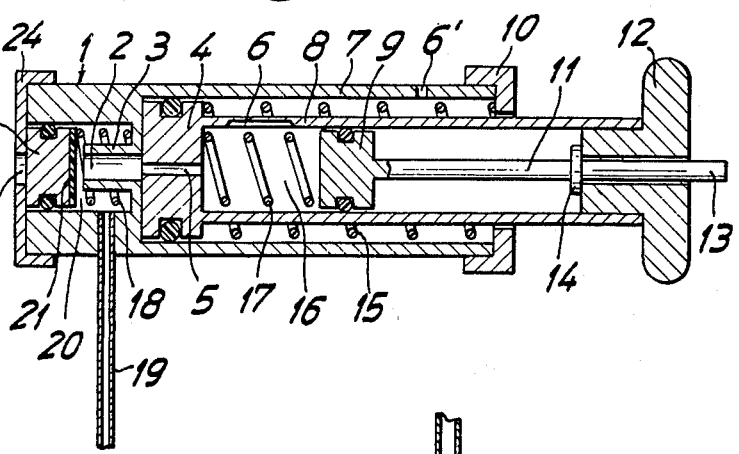
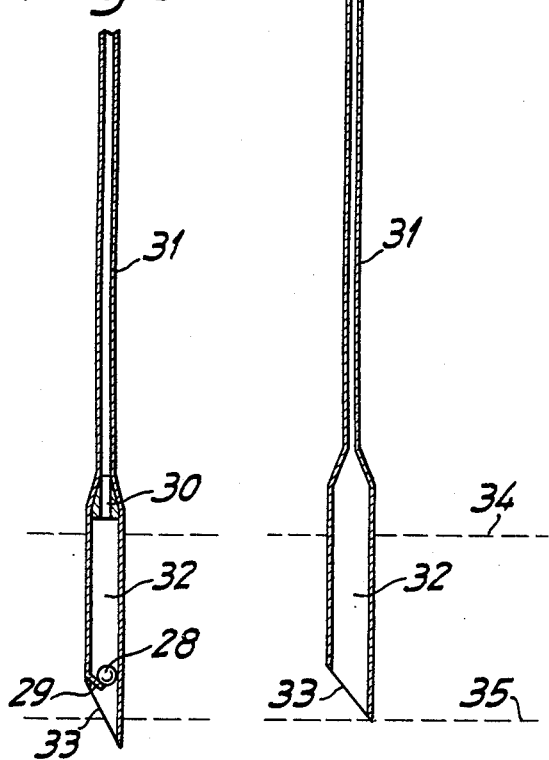
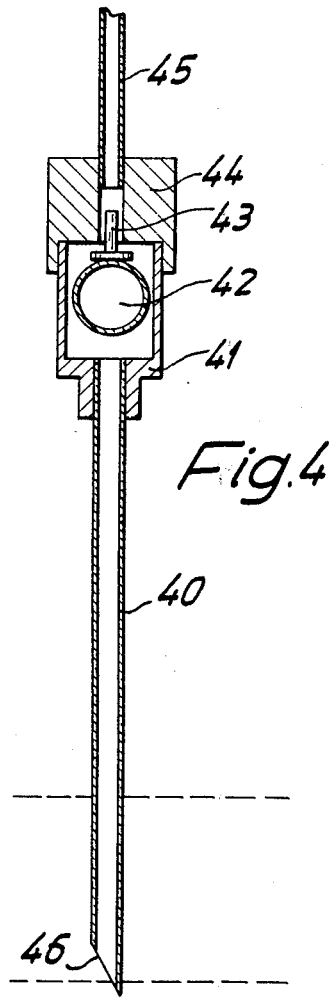

APPARATUS FOR CHECKING THE LEVEL OF LIQUID IN CONTAINERS

BACKGROUND OF THE INVENTION

The invention relates to an apparatus for cheking the presence of liquid at a predetermined level in a container, particularly in the crank case of an internal combustion engine.

Fluid level indicators are known, in which is disposed at the end of a pipe dipping into the liquid a valve, in which a valve body, for example a ball, is pressed against a valve seat by the rising liquid under the effect of a reduced pressure produced by a suction pump, whereby a reduced pressure, which serves for the indication of fluid level, arises in the suction duct of the pump. The valve in that case is so dimensioned, that the valve body is not pressed against the valve seat by the generated reduced pressure, when no liquid is present in the region of the suction opening at the end of the suction duct. The disadvantage of such arrangements consists therein, that the valve is constantly disposed in the liquid, so that the danger exists particularly when oil containers shall be monitored, that the valve becomes polluted by such oil in the course of time and no longer functions unobjectionably, particularly when the valve is of small dimension, such as is unavoidable when the valve is used for monitoring of the oil level in the crank case of an internal combustion engine and the valve is to be introduceable through the bore of the usual oil dip stick.

Not to bring the valve seat constantly into connection with the liquid and thus to reduce the danger of pollution and incrustation, it is known to construct the valve body not as a ball, but as a relatively long rod, which at its upper end is appropriately constructed for the cooperation with the valve seating. In the region of the valve body constructed as rod and of the valve seating, it is however necessary to construct the suction duct to be stiff to prevent a bonding of the suction duct and to ensure an unobjectionable displacement of the valve body in the suction duct. It is hereby however not always possible to introduce this apparatus through the bore of the usual oil dip stick in internal combustion engines, particularly when the guidance for the oil dip stick is constructed to arcuate. Beyond that, this construction affords no absolute security agaisnt a pollution of the valve seat and thus a faulty performance of the valve, even though the valve does not constantly dip into the liquid, yet liquid gets to the valve seat and the suction duct connected thereto during the checking process. Always according to the viscosity of the liquid, this will after completion of the checking process escape more slowly or more quickly from the valve, it not being avoidable here, that remnants remain, which lead to troubles in the course of time.

SUMMARY OF THE INVENTION

According to the present invention there is provided apparatus for checking the presence of a liquid at a predetermined level in a container, the apparatus comprising valve means disposed externally of such container, manually operable suction means to generte vacuum pressure and connected to the valve means, elongate duct means having constriction means between a first end portion extending into such container to define an opening in the duct means at th predetermined level and a second end portion connected to the valve means, the valve means being actuable by the suction means to close the duct means only on liquid being present at the predetermined level in such container, and indicator means responsive to the closure of the duct means by the valve means to indicate the presence of liquid at the predetermined level in such container.

The valve may be a pneumatic non-return valve, which does not immediately interrupt the flow to the vacuum source, but only after a certain pressure difference. A significant advantage of this construction consists therein, that the suction duct is free of built-in valves in the region of the liquid level to be monitored and thus can be costructed as a simple pipe of synthetic material or a simple hose of synthetic material, which is sufficiently flexible also to be able to be introduced through bent guides. The constriction means of the suction duct may be a portion of pipe of an internal diameter of 1 to 4 millimeters, preferably 1.5 to 2 millimeters. Due to the presence of such constriction means, an appreciable difference of the flow resistance of liquid compared with air exists in the duct. This difference in the flow resistance, which increases with increasing viscosity of the liquid, is employed to actuate the relay or switching valve arranged externally of the container. This switching valve, which can be arranged far away from the container, does not come into contact with the liquid, since on the entry of liquid into the suction duct, the flow resistance and thereby the reduced pressure generated in the suction duct rises so strongly, that the switching valve interrupts the connection to the vacuum source. The liquid thus rises only to a small degree in the suction duct. Since no kinds of fitting in the shape of valves or the like are provided in this region of the suction duct, the entering liquid cannot lead to troubles.

An advantageous development of the invention consists therein, that the relay or switching valve displays a closure body, which shuts off the suction duct on the occurrence of a certain magnitude of the reduced pressure caused by the vacuum source against the action of a preferably adjustable elastic force effect. It is hereby possible to match the switching valve to the viscosity of the liquid and thereby to the reduced pressure arising on the entry of the liquid into the suction duct.

In one example of embodiment of the invention, the relay or switching valve displays a valve housing with a concavely shaped valve surface, into which opens the piece part of the suction duct disposed in communication on the one hand with the container and on the other hand with the vacuum source and that the valve surface is surmounted by an elastic membrane, which seals off at the edges. On the occurrence of a corresponding reduced pressure, as this is the case on the entry of liquid into the suction duct after the vacuum source has generated a reduced pressure, the membrane lays itself against the valve face and thus interrupts the communication between the two piece parts of the suction duct.

Another advantageous development of the invention consists therein, that the relay or switching valve displays a valve housing with a cylindrical valve chamber bounded at both sides by end walls, in which a sealingly guided piston in its rest position is urged by a spring against the one end wall provided with a ventilation bore, while the other end wall carries a projecting sealing seat for the piston, into which opens the one piece part of the suction duct disposed in communication with the vacuum source and which together with the wall of the valve housing bounds a space, into which opens the piece part of the suction duct disposed in communication with the container. On the occurrence of a corresponding reduced pressure, the piston is pressed against the sealing seat against the action of a spring and thus interrupts the suction duct. The then arising reduced pressure serves as an indication, that liquid is present in the region of the suction opening of the suction duct.

Preferably, the relay or switching valve is arranged directly at the outside of the container. The volume of the suction duct between the suction opening and the switching valve is hereby kept as small as possible, whereby the effects of the reduced pressure remaining in the suction duct after its being shut-off by the switching valve are reduced. If namely the volume is large, then relatively much liquid is sucked into the suction duct up to the event of the pressure equalization.

When by contrast the distance from the container to be monitored and the suction pump serving as vacuum source is small, then according to a refinement of the invention, the valve housing can be integrally formed with the suction side of the housing of a suction pump, whereby fewer individual parts result.

Preferably, the suction pump displays a main piston displaceably in a cylinder against the action of a spring by means of a handle attached to a hollow piston rod and an auxiliary piston, which is sealingly guided in the hollow piston rod and which gounds an auxiliary space, which is disposed in communication with the suction side of the main piston and in which a spring supporting the auxiliary piston is provided and that the auxiliary piston is disposed in communication with an indicating device. When due to displacement of the main piston, a reduced pressure arises in the suction pipe, which in the presence of iquid at the suction opening leads to an actuation of the switching valve, so that the reduced pressure further increases, then the auxiliary piston — disposed in communication with the suction side of the main piston — is hereby displaced against the spring supporting it beyond a given magnitude of the reduced pressure. This displacement of the auxiliary piston serves to actuate an indicating device. If no liquid is present in the region of the suction opening, then the switching valve does not shut-off the suction duct, whereby only a small reduced pressure sets in at the suction side of the main piston corresponding to the small flow resistance in the suction duct, which does not suffice to displace the auxiliary piston and thereby actuate an indicating device.

The indicating device can according to an advantageous development of the invention consist of a warning pin connected with the auxiliary piston and guided through the handle. This will be drawn into the handle by virtue of the displacement of the auxiliary piston in the presence of a coresponding reduced pressure at the suction side of the main piston. The disappearance of this warning pin indicates, that liquid is present in the region of the suction opening. By contrast, the warning pin remains visible when due to too small a reduced pressure the auxiliary piston is not displaced. It is hereby indicated, that no liquid is any longer present in the region of the suction opening of the suction duct.

So that the liquid entering the suction duct during a checking process with certainty again gets out of the suction duct in the fastest way, the suction pump in further development of the invention is so constructed, that a greater volume of air is impressed into the suction duct on a return of the main piston into its rest position than would correspond to the movement of the main piston during the suction process. For this, the wall of the auxiliary space in the region of the spring displays a groove serving as bypass, through which air gets to the suction side of the main piston after a corresponding displacement of the auxiliary piston against the action of the spring. This air entering at the suction side of the piston during the suction process serves on the return of the main piston into its rest position, into which it is pressed by a spring, to effectively displace the liquid present in the suction duct. To be able to impress this greater quantity of air into the suction duct, there can also be provided in the cylinder of the main piston in the proximity of the end of the suction stroke a throttle bore, through which the air after completion of the suction process can flow to the suction side of the piston. This development can be provided either additionally to the arrangement of the auxiliary piston or also without auxiliary piston. This additional air flowing over the bypass can be utilised to actuate an indicating device, for example an acoustical indicating device, such as a whistle. When no liquid is disposed in the region of the suction opening, then air instead of liquid is sucked in through the suction opening, whereby the reduced pressure on the suction side of the piston is so small, that no additional air flows in through the bypass. The acoustical indicating device is therefore not actuated.

According to another development of the invention, the vacuum source can display a piston displaceable in a cylinder against the action of a spring by means of a handle attached to a hollow piston rod and a push rod, which is guided in the hollow piston rod and which in the rest position of the piston pushes into its outer stable position an elastic membrane, which closes off a hollow space in the handle connected with the suction side of the piston and which snaps into its inner stable position on the occurrence of a certain suction action. It is evident according to the respective position of the membrane whether liquid is present or not in the region of the suction opening of the suction duct, since in the absence of liquid the reduced pressure generatd by the pump is so small, that the membrane does not snap into its inner stable position. A further improvement of the indication can be attained thereby, that the external face of the membrane is provided with grooves. These grooves gape apart in the outer stable position of the membrane, while they are closed in the inwardly plugged position of the membrane. The membrane hereby feels rough in the one case and smooth in the other case. When the grooves according to a further development of the invention display a different colour than the external surface of the membrane, then the membrane in the inwardly plugged position is monochromatic, while in the outwardly plugged positon, it displays additional differently coloured strips, which improve the indicating fuction.

To avoid possible consequences of deposits from the liquid with certainly also in the end of the suction pipe free of valve units, the end of the suction duct dipping into the iquid may be cnstructed as an enlarged end piece, that is, as a duct end portion of relatively larger internal diameter. By this enlargement of the throttle pipe to an internal diameter of about 4 to 6 it is prevented with certainly, that deposits can lead to operational faults.

To promote the running-off of the liquid from the suction duct, the end of the suction duct dipping into the liquid is obliquely cut off. This measure influences the mode of action of the apparatus in such favourable manner, that it is hereby possible to provide a valve in the region of the end of the suction duct, when the incorporation of the valve ensues in connection with an enlarged end piece without the initially described disadvantages appearing with comparable dimensions. This oblique formation of the lower end of the suction duct thus represents a characteristic, which independently of the arrangement of the shut-off device improves every liquid level indicating device in its operation. For this region, this formation is not limited to the arrangement of the shut-off device outside the container. An embodiment can rather consist therein, that the constriction means comprises a valve seating is formed at the transition location between the end piece and the throttle pipe and inserted in the end piece is a ball, the specific weight of which is greater than that of the liquid and the diameter of which is so dimensioned relative to the internal diameter, that — on the action of a reduced pressure generated by the suction pump and in the presence of liquid in the region of the suction opening — the ball is pushed against the valve seat, the sucked-up liquid being however able to flow away on falling-off of the reduced pressure between the ball and the inside wall of the end piece and that the ball is secured against a falling out of the end piece by a projection, which brings the ball to rest against the longer wall region of the end piece caused by the oblique opening. Thereby, that the ball is brought by the projection to rest against the longer wall region of the end piece caused by the oblique opening, the liquid present in the end piece can without obstruction flow away through the gap between the ball and the wall on lowering of the liquid level in the container, whereby it is made certain, that no liquid remains between ball and the wall of the end piece, which could cause a sucking-up of the ball although the liquid level in the container has already sunk below this level. By the resting of the ball against the wall of the end piece, a gap if freed on one side, the dimension of which is of course larger than when the ball would be centrally disposed in the middle of the suction duct. In connection with the oblique end of the suction duct, a reliable apparatus for the monitoring of the liquid level in contrainers and particularly in the crank case of internal combustion engines is hereby created.

According to a preferred development of the invention, the projection can be formed by a tongue, which lies obliquely to the longitudinal axis of the end piece and which is blocked out of the end piece at the upper end of the oblique opening.

To be able to employ also suction ducts greater in diameter, as this can be advantageous in the case of certain conditions of incorporation, or to ensure a certain response of the switching valves even for liquids with a very low viscosity, the enlarged end piece is in a further development of the invention prolonged up to the outside of the container to be monitored and opens into a valve housing, in which a float is provided for actuation of the valve closure body. In the presence of liquid in the region of the suction opening, this is then sucked up to the float, which then floats and presses the valve body against the valve seat in the valve housing. The suction duct is thereby interrupted, whereby the reduced pressure rises so high, that the switching valve responds even when the suction duct exhibits a large diameter, which on the entry of liquid would not suffice to provoke the corresponding pressure difference for actuation of the switching valve. Even when the valve due to deposits in the course of time should not close exactly, then the flow resistance generated hereby is still so great, that the switching valve responds in each case. In the case of liquids, which do not tend to deposits, this development can be of application even without relay or switching valve since the float can effectively interrupt the suction duct in connection with valve, so that the arising reduced pressure effects an indication.

BRIEF DESCRIPTION OF THE DRAWINGS

Embodiments of the present invention will now be more particularly described by way of example with reference to the accompanying drawings, in which:

FIG. 1 shows a section through an apparatus for checking the level of liquid in containers, in accordance with a first embodiment of the invention;

FIG. 2 shows a section through a modified part of the apparatus shown in FIG. 1;

FIG. 3 shows a further modified part of the apparatus shown in FIG. 1;

FIG. 4 shows a section through part of apparatus for checking the level of liquid in containers, in accordance with a further embodiment of the invention.

DESCRIPTION OF THE PREFERRED EMBODIMENTS

Figure 5:
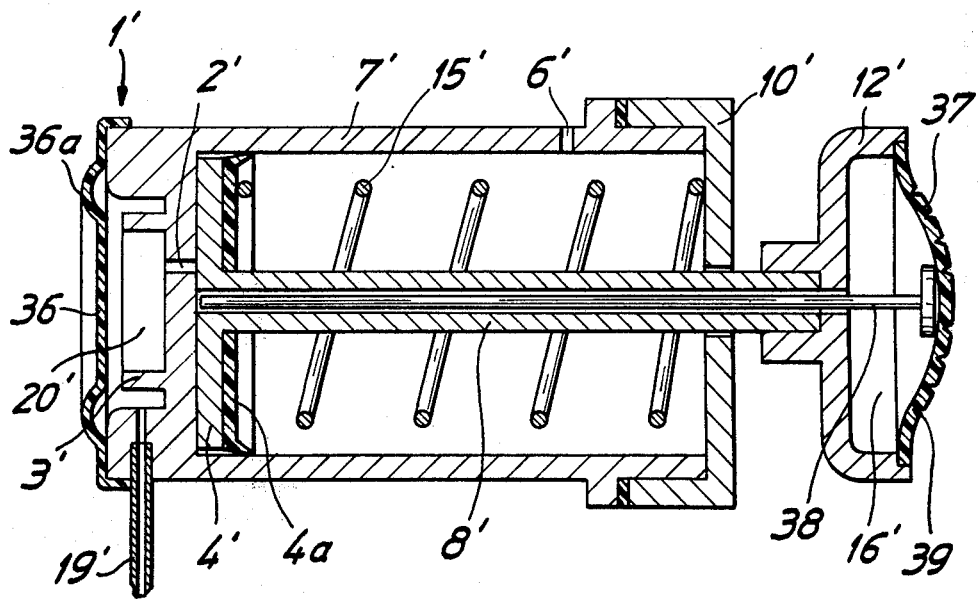
FIG. 5 shows a section through apparatus for checking the level of liquid in a container in accordance with a yet further embodiment of the invention.

Illustrated in the Figures are arrangements for checking the level of liquid in containers, which are specially adapted to the requirements of the testing of the oil level in the crank case of internal combustion engines. As is evident from FIG. 1, the apparatus for checking the level of liquid includes a combined switching valve and suction pump unit 1, 7 and a suction duct 31, which includes constriction means. The constriction means may comprise a portion of the duct having an internal diameter sufficiently small to significantly impede the flow of iquid along the duct. Thus, the suction duct 31 shown in FIG. 1 consists of a flexible capillary tube, which is introduceable in place of the oil dip stick of an internal combustion engine into the guide of this oil dip stick. The end of the suction duct dipping into the oil displays an end portion 32 enlarged in diameter and with an oblique opening 33. The end portion or piece, which is matched to the diameter of the dip stick bore, dips about 1 to 2 centimeters below the maximum oil level, which is designated by 34. The suction opening 33 thus lies in about the middle between the maximum oil level 34 and the minimum oil level 35.

The suction duct 31 is connected to a connection stub 19, which opens into a space 20 of the switching valve 1, the valve housing of which is constructed to be integral with the valve housing of the suction pump 7. The space 20 is bounded on the one hand by the inside wall of the valve housing and by a sealing seat 3 projecting into the valve housing, into which opens a bore 2 serving as piece part of the suction duct and connecting the switching valve 1 with the suction side of the suction pump 7. Formed in the switching valve 1 is a closure body 22 in the shape of a sealingly guided piston, which under the action of a spring 18 — which supports itself at the separating wall to the suction pump — rests against an end wall 24, which is formed as a closure cap and in which a ventilating bore 23 is provided.

The suction pump displays a main piston 4, which is sealingly guided in the housing of the suction pump 7 and — for the generation of a reduced or suction pressure — is displaceable against the action of a compression spring 15 by means of a handle 12 arranged at a hollow piston rod 8, which is guided in the lid 10. The main piston 4 displays a central bore 5, which connects the suction side of the piston with an auxiliary space 16 within the hollow piston rod, which is bounded by an auxiliary piston 9 sealingly guided in the hollow piston rod 8. By a compression spring 17, which supports itself against the main piston, the piston 9 is retained in its rest position, which is determined by a collar 14, which sits on a warning pin 11 constructed as a piston rod and rests itself against the handle 12. In the rest position, the warning pin 11 projects by one end 13 out of a bore of the handle 12.

If the main piston 4 is now displaced against the action of the compression spring 15 by withdrawal of the handle 12, then a reduced pressure is hereby generated at the suction side of the piston 4, the bore 2, the space 20 and finally in the suction duct 31. If liquid is disposed in the region of the suction opening 33, then this enters into the enlarged end piece 32 and gets in part into the part of the suction duct 31 constructed as choke pipe. The flow resistance hereby becomes so great, that the reduced pressure rises, whereby the closure body 22 of the switching valve 1 is pushed against the sealing seat 3 against the action of the spring 18. For the attainment of a good sealing, the closure body 22 is provided with a seal 21. In the case of the illustrated example of embodiment, the reduced pressure at this instant displays a valve of approximately 1.5 meters of water and the main piston has traversed about a quarter of its entire stroke. When the main piston 4 is then moved further to the right, the reduced pressure increases in the suction space of the suction pump 7. When this reduced pressure in the case of the illustrated example of embodiment has attained about 3 to 4 meters of water the auxiliary piston 9 is moved to the left against the action of the spring 17 due to the reduced pressure, which propagates through the bore 5 into the auxiliary space 16, so that the visible end 13 of the warning pin 11 disappears in the handle 12. It is hereby indicated, that oil is present in the region of the suction opening.

On the displacement of the auxiliary piston 9, this gets into the range of a groove 6, which is provided in the inside wall of the hollow piston rod 8 and which acts as bypass and through which the air can get round the auxiliary piston 9 and through the bore 5 to the suction side of the main piston. Although the reduced pressure at the suction side of the main piston is lowered hereby, so that the auxiliary piston 9 again moves out of the range of the groove 6, the reduced pressure is however again increased on a further motion of the main piston, so that the auxiliary piston again gets into the region of the groove with the consequence of the supply of further air to the suction side of the main piston 4. On completion of the checking process, this entry of additional air leads thereto, that the main piston again pressed back into the initial position by the compression spring displaces a greater volume than corresponds to its piston stroke. It is made certain hereby, that the liquid, which has entered the suction duct 31 during the checking process, is again pushed out with certainty.

Furthermore, air can get through a choke bore 6' at the end of the suction stroke of the main piston to its suction side. The air entering through this choke bore 6' can also serve for the actuation of a whistle, so that the arrangement of the auxiliary piston 9 can be dispensed with.

FIG. 2 shows a modified embodiment of a switching valve 25, which displays a concave valve face 26, into which opens the piece part of the suction duct 19' or 2', respectively, which is on the one hand in communication with the container and on the other hand with the suction pump. The concave valve face is surmounted by an elastic membrane 27, which is sealingly fixed at the edge of the valve housing. Should now a reduced pressure occur, which is caused by the entry of liquid into the suction duct, then the membrane 27 lays itself sealingly against the valve face 26, and interrupts the suction duct and thereby the connection to the suction side of the suction pump, whereby the visible end 13 of the warning pin 11 disappears into the handle 12 as in the case further described above. If contrary thereto no liquid is present in the region of the suction opening 33, then air is sucked in to the suction duct 31. The flow resistance of air is however substantially smaller than that of the liquid, so that the switching valve 1 or 25 does not respond. The visible end 13 of the warning pin 11 does not disappear into the handle and thus indicates, that no liquid is any longer present in the region of the suction opening 33.

The FIG. 3 shows a modified embodiment in the region of the end piece 32 of the suction duct 31. Here, in this end piece is inserted constriction means in the form of a valve ball 28, the specific weight of which is greater than that of the liquid and which is prevented against falling out by an inwardly bent tongue 29, which is stamped out of the wall and which is set obliquely to the longitudinal axis of the end piece, whereby the ball comes to rest against the longer wall region of the end piece 32 caused by the oblique opening. Between the ball 28 and the inside wall of the end piece 32 in the shorter wall region caused by the oblique suction opening 33, a relatively large gap is hereby created, through which the liquid having entered the suction duct can again flow away after completion of the checking process. When during a checking process, liquid is present in the region of the suction opening 33, then this liquid is lifted upwardly together with the valve ball 28 until the ball 28 rests sealingly against a valve seat 30, which is formed at the transition location between the end piece 32 and the choke pipe of the suction duct 31. Since the valve ball 28 seals sufficiently well, it is possible to operate this embodiment also without switching valves 1 or 25.

In the case of a further embodiment illustrated in FIG. 4, an enlarged end piece 40 of a suction duct 45 maintained wider in diameter is constructed to be so long, that it reaches up to constriction means comprising further valve means provided with a valve housing 41, which is mounted externally of the container or the crank case. A float 42 constructed as hollow sphere is disposed in the valve housing 41. A closure cap 44 is constructed as valve seat, in which a closure body 43 can freey move. If a reduced pressure is generated by the suction pump as described above, then liquid rises through the end piece 40 into the valve chamber, whereupon the float 42 rises upwardly and presses the closure body 43 against the valve seat and shuts off the suction duct 45. A reduced pressure, which leads to the indication further described above, thereby arises in the suction pump. Although this embodiment can likewise be operated without switching valve, it recommends itself to provide a switching valve 1 or 25, since a certain closure of the valve is to be guaranteed only with difficulty and it must in any case be avoided, that in the case of prolonged actuation of the suction pump, oil gets through the not unobjectionably closing valve into the suction duct from there into the suction pump. The suction opening of the suction duct 45 is designated by 46.

FIG. 5 shows a suction pump 7', the housing of which is formed integrally with a switching valve 1', which is connected to the suction side of the pump. Just as in the case of the embodiment according to FIG. 1, a connecting stub 19' of a not shown suction duct opens into a space 20' of the switching valve 1'. The membrane 36 is provided with an annular outward bow 36a to hold the membrane in the open position, i.e., lifted off from a sealing seat 3'. Should the membrane 36 rest against the sealing seat 3', then the connecting stub 19' is separated from a bore 2' in the bottom of the housing of the suction pump, which connects the space 20' with the suction side of the piston 4', which is pressed by a spring 15' into the shown rest position. A seal of the pump is designated by 4a. The space, in which the spring 15' is arranged, is connected with atmosphere through a choke bore 6'. The pump housing is closed by a lid 10', which serves for the guidance of a hollow piston rod 8', which carries a knob-like handle 12', which is constructed to be hollow, the hollow space 16' being closed off by a membrane 37. The hollow space 16' is in communication with the suction side of the piston 4' through the hollow piston rod 8'. The membrane 37 is so constructed, that it displays two stable positions, wherein the outwardly plugged position is shown in the drawing. Provided within the piston rod is a push rod 38, which in the rest position of the piston 4' of the suction pump 7' keeps the membrane in the outwardly plugged position. Should liquid be disposed at the end of the suction duct, then after actuation of the piston 4', the membrane 36 is drawn against the sealing seat 3' because of the high flow resistance in the suction duct and the connection between the suction duct and the suction side of the piston 4' is thereby interrupted. The reduced pressure on the suction side of the piston thereby rises still more strongly, whereby the membrane snaps into its inner position. After completion of the cheking process, the spring 15' presses the piston 4' again into its end position, whereby the push rod 38 abuts at the bottom of the suction pump 7' and pushes the membrane 37 again into its outwardly plugged position.

The membrane 37 is provided with circularly shaped grooves 39, which in the outwardly plugged position of the membrane lend a rough surface thereto, so that the position of the membrane can be ascertained in the dark by feeling. The grooves 39 can also be coloured in differently, so that they are visible in the outwardly plugged position of the membrane, but however, no longer visible in the inwardly plugged position, which likewise represents in indication for the presence of liquid at the suction opening of the suction duct. Should no liquid be disposed at the suction opening of the suction duct, then air is sucked in and the reduced pressure on the suction side of the piston and thus in the space 16' is so small, that the membrane 37 remains in its outwardly plugged position.

When during the actuation of the suction pump, the piston 4' is drawn against the action of the spring 15' into its end position opposite to the end position shown in FIG. 5, then air gets through the choke bore 6' to the suction side of the piston, when reduced pressure prevails on the suction isde of the piston, which occurs in a manner worthy of mention only then, when liquid is present in the suction duct. By the entry of air to the suction side of the pistion, it is assured, that it in its end position caused by the action of the spring 15' again displaces with certainty out of this suction duct the liquid drawn into the suction duct. This additional air volume thus serves for blowing out the suction duct. In spite of the entry of additional air to the suction side of the piston, the position of the membrane does not change, i.e., the membrane snapped into the inner end position by virtue of the reduced pressure remains in this position in spite of the reduction of the reduced pressure due to the air entering through the choke bore 6', since the membrane 37 displays a snap effect and is only pressed outwardly by the push rod 38, when the piston 4' is again disposed in the end position shown in FIG. 5.

I claim:
1. Apparatus for checking the presence of liquid at a predetermined level in a cntainer, the apparatus comprising, in combination:
   valve means disposed externally of said container;
   manually operable suction means to generate vacuum pressure and connected to said valve means;
   elongate duct means having constriction means between a first end portion extending into said container to define an opening in said duct means at said predetermined level and a second end portion connected to said valve means, said valve means being actuable by said suction means to close said duct means only on liquid being present at said level; and
   indicator means responsive to the closure of said duct means by said valve means to indicate the presence of liquid at said level.

2. Apparatus as defined in claim 1, wherein said cnstriction means comprises a portion of said duct means, said portion having an internal diameter of between 1 and 4 millimeters.

3. Apparatus as defined in claim 2, wherein said internal diameter is between 1.5 2 millimeters.

4. Apparatus as defined in claim 1, wherein said valve means comprises a housing and a valve element movable relative to said housing between an open position and a closed position, and biassing means to resiliently urge said element towards said open position, said valve element being moved into said closed position when suction pressure generated by said suction means exceeds the force exerted on said element by said biassing means.

5. Apparatus as defined in claim 4, wherein said biassing means is adjustable to pre-set said force exerted on said element by said biassing means.

6. Apparatus as defined in claim 4, wherein a portion of said valve housing defines a concave seating surface and said movable valve element comprises a resilient diaphragm disposed in mutually facing relationship with said seating surface, said seating surface having a first orifice communicating with said duct means and a second orifice communicating with said suction means, said diaphragm contacting said seating surface to close each of said orifices when said diaphragm is in said closed position.

7. Apparatus as defined in claim 6, wherein said diaphragm surmounts said portion of said housing, an edge portion of said diaphragm being mounted in cntact with said housing portion to seal the periphery of said concave seating surface.

8. Apparatus as defined in claim 4, wherein said housing defines a cylindrical valve chamber bounded at one end by a first end wall having a ventilator passage therein and bounded at the other end by a second end wall, said movable valve element comprising a piston slidably disposed in said cylindrical valve chamber and resiliently urged by spring means against said first end wall, said second end wall carrying valve seating means projecting therefrom and provided with a passage communicating with said suction means, said chamber communicating with said duct means and said piston being urged against said seating in the closed condition of said valve element.

9. Apparatus as defined in claim 1, wherein said valve means is mounted directly on the outer wall of said container.

10. Apparatus as defined in claim 4, wherein said suction means comprises a pump housing and at least part of said valve housing is integral with at least part of said pump housing.

11. Apparatus as defined in claim 1, wherein said suction means comprises a suction pump provided with a housing defining a first cylindrical cavity, a first piston slidably disposed in said first cylindrical cavity, first spring means resiliently urging said first piston towards one end wall of said first cylindrical cavity, a hollow piston rod having one end portion thereof connected to said first piston, a handle connected to the other end portion of said hollow piston rod, a second piston slidably mounted in said hollow piston rod to define one end wall of a second cylindrical cavity communicating with the low pressure of said first cylindrical cavity, second spring means diposed in said second cylindrical cavity to urge said second piston therealong, said second piston being operatively associated with said indicator means.

12. Apparatus as defined in claim 11, wherein said indicator means comprises a pin connected to said second piston and slidably guided in a bore through said handle.

13. Apparatus as defined in claim 11, wherein a portion of the peripheral wall of said second cylindrical cavity in the vicinity of said second spring means defines a groove to by-pass said second piston when the latter is disposed opposite said groove.

14. Apparatus as defined in claim 13, wherein said indicator means is actuable in response to air flowing through said groove towards the low pressure side of said first cylindrical cavity.

15. Apparatus as defined in claim 1, wherein said suction means comprises a suction pump provided with a housing defining a cylindrical cavity, a piston slidably disposed in said cylindrical cavity, spring means resiliently urging said piston towards one end wall of said cylindrical cavity, a hollow piston rod having one end portion thereof connected to said piston, a hollow handle connected to the other end portion of said hollow piston rod, a pushrod slidably guided in the bore of said hollow piston rod and in the bore of said hollow handle to project into a further cavity defined in said hollow handle and communicating with the suction side of said cylindrical cavity, an elastic membrane enclosing said further cavity and selectively engageable with the projecting end portion of said push-rod, said piston at the end of its suction stroke permitting communication between the suction side of said cylindrical cavity and the atmosphere via a ventilator passage in the peripheral wall of said cylindrical cavity, said membrane having an outer stable position into which said membrane is pushed by engagement with said projecting end portion of said push-rod when said piston abuts against said one end wall of said cylindrical cavity, and said membrane having an inner stable position into which it snaps when the suction pressure generated in the low pressure side of said cylindrical cavity attains a predetermined value.

16. Apparatus as defined in claim 15, wherein the external surface of said elastic membrane defines a plurality of grooves therein.

17. Apparatus as defined in claim 16, wherein the groove portions of said external surface of said membrane are of a colour different from that of other surface portions of said external surface.

18. Apparatus as defined in claim 1, wherein said one end portion of said elongate duct means is of larger internal cross-sectional area that the other portion of said duct means.

19. Apparatus as defined as in claim 1, wherein one longitudinal wall portion of said enlarged end portion of said duct means is longer than a longitudinal wall portion thereof opposite said one longitudinal wall portion, whereby the end face of said enlarged end portion defining said opening is inclined to the horizontal.

20. Apparatus as defined in claim 19, wherein a valve seating is provided at the transition between said enlarged end portion of said duct means and said other portion of said duct means, and wherein a ball is provided in said enlarged end portion, said ball having a specific gravity greater than that of said liquid and a diameter such that — on said liquid being present at said level when said suction means is actuated — said ball is urged against said valve seating to close said duct means, said ball being retained in said enlarged end portion by a prong projecting into the bore of said enlarged end portion in the vicinity of said opening, said prong being so inclined as to direct said ball against said longer longitudinal wall portion of said enlarged end portion.

21. Apparatus as defined in claim 20, wherein said prong comprises a tongue portion stamped-out of an edge portion the shorter longitudinal wall portion of said enlarged end portion next adjacent said opening, said tongue extending traversely of the longitudinal axis fo said enlarged end portion of said duct means.

22. Apparatus as defined in claim 1, comprising further valve means connected serially in said duct means, said further valve means comprising a housing defining a float chamber and a float disposed in said float chamber the portion of said duct means extending between said float chamber and said container being of larger cross-sectional area then that of the duct portion extending between said float chamber and said first mentioned valve means.

* * * * *